United States Patent [19]

Stuckey et al.

[11] Patent Number: 5,649,013
[45] Date of Patent: Jul. 15, 1997

[54] ROYALTY TRACKING METHOD AND APPARATUS

[75] Inventors: Kent D. Stuckey, Columbus, Ohio; Douglas P. Chinnock, Tucson, Ariz.; Jon L. Roberts, McLean, Va.

[73] Assignee: CompuServe Incorporated, Columbus, Ohio

[21] Appl. No.: 363,747

[22] Filed: Dec. 23, 1994

[51] Int. Cl.⁶ .................................................. H04L 9/00
[52] U.S. Cl. ............................ 380/4; 380/23; 380/49
[58] Field of Search ........................ 380/3, 4, 23, 24, 380/25, 49, 55, 51

[56] References Cited

U.S. PATENT DOCUMENTS

| | | | |
|---|---|---|---|
| 4,725,977 | 2/1988 | Izumi et al. | 364/900 |
| 4,768,087 | 8/1988 | Taub et al. | 358/84 |
| 4,827,508 | 5/1989 | Shear | 380/4 |
| 4,965,680 | 10/1990 | Endoh | 380/4 |
| 4,977,594 | 12/1990 | Shear | 380/4 |
| 5,050,213 | 9/1991 | Shear | 380/25 |
| 5,132,992 | 7/1992 | Yurt et al. | 375/122 |
| 5,214,696 | 5/1993 | Keiser, II et al. | 380/4 |
| 5,251,294 | 10/1993 | Abelow | 395/155 |
| 5,444,779 | 8/1995 | Daniels | 380/4 |

*Primary Examiner*—David C. Cain
*Attorney, Agent, or Firm*—Standley & Gilcrest

[57] ABSTRACT

A system that facilitates tracking of computer files that have been received from on-line information services, such as CompuServe. Tracking is accomplished by adding a "handling list" to each file as an obscure part of its archive structure. The actual format and location of this list may vary, depending on whether the file is a picture, program, system, or other type of file. Extraction and archive utilities maintain and update the list.

21 Claims, 2 Drawing Sheets

ROYALTY TRACKING METHOD AND APPARATUS

FIELD OF THE INVENTION

The present invention relates generally to systems for providing on-line interactive services. More particularly, the present invention relates to a method and apparatus for insuring that royalties are properly assessed on data retrieved from an interactive service.

BACKGROUND OF THE INVENTION

Interactive services provide a wide variety of data and on-line information to individual subscribers. Many service providers, such as CompuServe, have for a long time made information available to users in a highly interactive fashion. Much of this information may be downloaded by the user for printing or for future use.

Such on-line service providers electronically "publish" information that is contained in literally hundreds of databases. In some cases, the owners of these databases have expended large amounts of money to develop the information and to provide it to subscribers in a user-friendly fashion. To compensate these database providers for the time, effort, and expense involved in establishing and maintaining the database, a per-use charge or royalty is charged to subscribers accessing the database.

Information made available by database providers can be technical information, music, graphical information, and a host of other types of information, all of which is easily stored in a database and accessed by users in an on-line fashion. These types of information also constitute copyrightable subject matter. Once accessed by legitimate users it is easily stored off-line—and copied.

It is unfortunate that in today's computer-permeated society, copyrighted information is often copied by individuals who have no intention of paying a royalty to the creator or provider of that information. This has an immediate detrimental impact on the database owner in that a royalty for use of the data is not collected. In a greater sense, such abuse and economic loss discourage developing business entities from entering the on-line service provider marketplace, thereby denying legitimate users access to information and squelching innovation.

Certain systems have been devised which address some of the issues noted above. For example, U.S. Pat. No. 5,251,294 to Abelow was issued for "Accessing, Assembling, and Using Bodies of Information." This invention comprises an interactive system with a built-in copyright accounting feature. However, the system does nothing to track unauthorized copying that occurs once the information is in the hands of a legitimate user.

U.S. Pat. No. 5,214,696 to Keiser, II et al. describes a "Data Processing System and Method to Produce Softcopy Book Readers, Which are Limited to Reading Only Books Published by a Specific Publisher." This system is actually an access control system whereby only users having a certain "key" can have access to a particular book in softcopy form. Again, while this invention limits access to the data available on a system, it does nothing to track that data once the information is downloaded and copied.

U.S. Pat. No. 5,132,992 to Yurt et al. describes an "Audio and Video Transmission and Receiving System." This system is an interactive multi-media type information subscription service which provides both picture and sound transmission over communications channels. While this invention addresses the issue of multi-media transmission over a communications link, it does not provide a means for tracking that information in case it is illicitly copied.

U.S. Pat. No. 5,050,213 to Shear describes a "Database Usage Metering and Protection System and Method." This system addresses the issue of illegal copying of databases by encrypting databases stored on a mass storage device. As a user accesses information, it is decrypted and the access is recorded, with billing being accomplished based on an appropriate user fee. Again, this system limits access to the information but does nothing to determine whether that information is being subsequently copied by an unauthorized person. U.S. Pat. No. 4,977,594 to Shear and U.S. Pat. No. 4,827,508 to Shear also disclose systems for encrypting a database. However, nothing is done to track subsequent copying.

U.S. Pat. No. 4,768,087 to Taub et al. discloses an "Education Utility." This invention is a system for distributing educational information in digital form to schools via satellite to FM stations. The system also keeps track of usage to permit billing of royalty charges. Once again, however, no provision is made for tracking subsequent copying after an initial transmission.

U.S. Pat. No. 4,725,977 to Izumi et al. describes a "Cartridge Programming System and Method Using a Central and Local Program Library." This is a system for keeping account of the use of data to assure the payment of royalties. However, nothing is done to track data in the event it is illicitly copied.

While all of the above systems address the problem of charging a royalty or fee for downloaded copyrighted material, none of the systems attempts to solve the problem of subsequent, royalty-free copying. A system which could track subsequent copying would allow the collection of more royalty fees, deter future copyright infringement, and encourage innovation among current and potential database service providers.

SUMMARY OF THE INVENTION

It is therefore an object of the present invention to provide a system that tracks all downloading of information from a database service provider to a subscriber.

It is a further object of the present invention to provide a system that tags all downloaded files with an itinerary showing information regarding all previous file transfers.

It is another object of the present invention to provide a system that tags all files with file transfer itineraries that are transparent to forum subscribers.

It is an additional object of the present invention to provide a system that will allow the determination of the last authorized file transfer, so that unauthorized file copies may be traced to the first unauthorized file disseminator.

It is also an object of the present invention to provide a system that identifies the source of illicit copyrighted file dissemination so that royalties can be assessed.

These and other objects and advantages of the present invention will be apparent to those of Ordinary skill in the art after inspection of the following description, drawings, and appended claims.

The present invention is particularly applicable to a "shareware" library system used by subscribers to download copies of computer files for initial trial. These downloaded copies are fully operational but are supposed to be "registered" with the author within a prescribed trial period. This registration functions as a license, and a small fee or royalty is usually charged. Further dissemination of the files is encouraged to proliferate the products and produce more registrations, and therefore more royalty payments. Historically, the shareware principle has been based on honesty, that is, there has been no way to police the registration and payment process, leaving it up to the subscriber to voluntarily comply. However, frequent violations of this registration policy occur. One difficulty with policing use of shareware files lies in the lack of any tracking capability associated with the process.

The system of the present invention provides several methods of tracking shareware or other downloaded files. In each of these files, an obscure space has been chosen to insert "tracking tags" (TRTs) which each contain a "tracking itinerary" (TRI). For instance, in a JPEG image file, the tracking tag may be inserted into an always skipped APP marker. GIF files might have an application extension that carries tracking history. The TRTs record pertinent information regarding the current file transfer. The TRI includes a history of transfers that have taken place on the file, leading from the current owner to the file originator.

This insertion of TRTs can be performed by the creator of the file (using a file generator program), by a program that the SYSOP (forum system operator) runs, or by the program the host uses to send the file to the recipient. Given the format of the TRT and the location in which it will be placed, any programmer of ordinary skill can easily develop a program that determines where and how to insert the TRT and build the TRI. To ensure authenticity of the TRI, it is encoded and a checksum or other verification string is appended using known methods. Another set of programs can be used to display the TRI when needed by a file supplier. This need will arise when an unauthorized copy of the file is discovered.

Because the TRI includes a history of all legitimate file transfers beginning with the file originator, the last TRT in the TRI will include all pertinent information regarding the last legitimate file transfer. If an unauthorized third party is later found in possession of a copy of the file, the TRI can be analyzed to determine the last authorized recipient of the file. This person will therefore also be the first unauthorized disseminator of the file. This person can then be assessed royalties for the unauthorized copying and dissemination of the copyrighted file.

DETAILED DESCRIPTION OF THE PRESENT INVENTION

Figure 1:
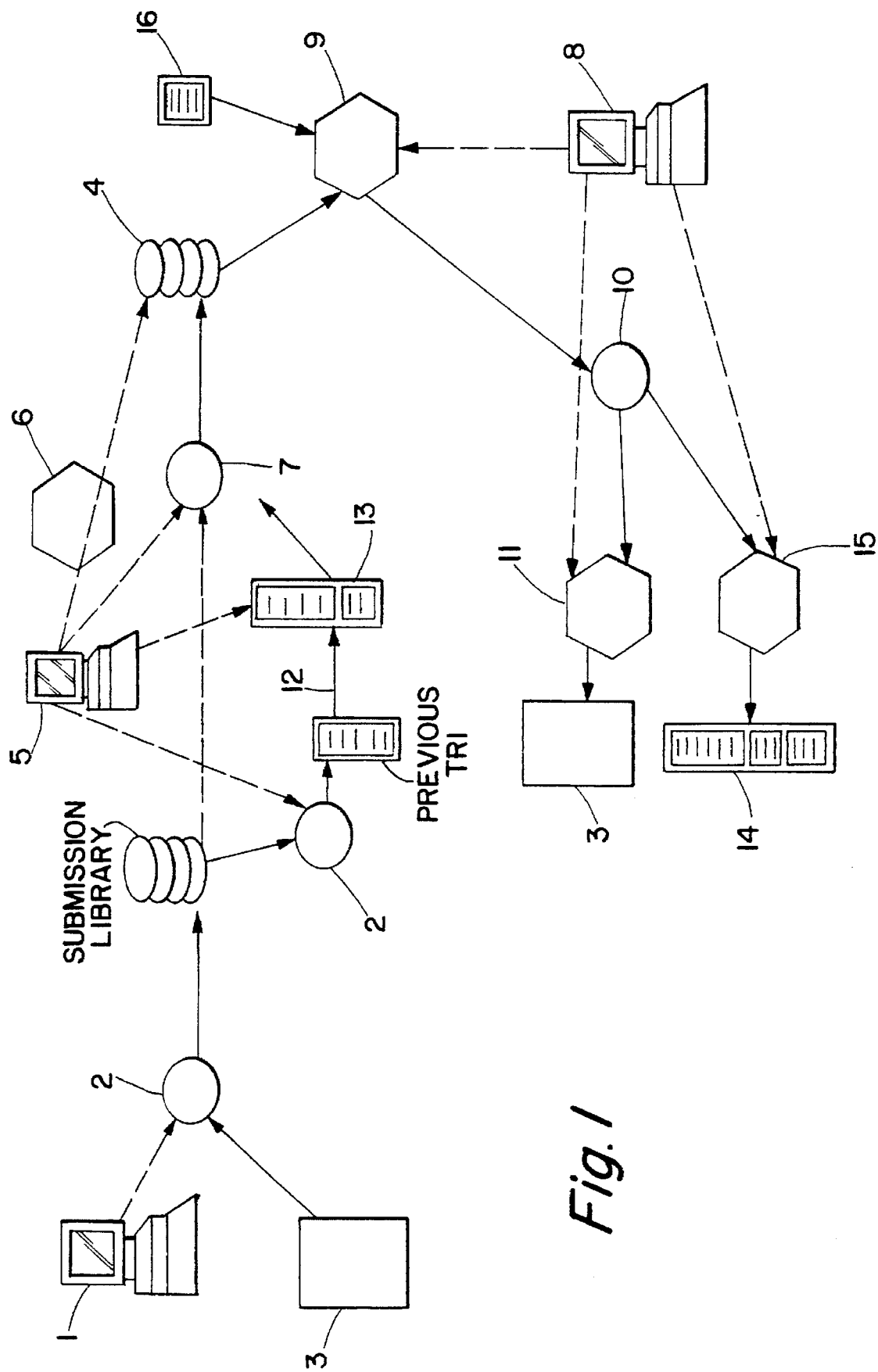
FIG. 1 shows the route that a Graphics Interchange Format file might take from the time it is authored, through its submission to a library and its retrieval from that library, to its viewing by a client.

FIG. 1 is a flow diagram depicting the route of a file as it is passed from the originator to an on-line database subscriber. As an example, the originator will be a graphics file author generating a file in a graphics interchange format ("GIF"). It will be appreciated by persons of ordinary skill in the art that any type of file that can be submitted to the on-line service and subsequently copied is suitable for use with the system of the present invention.

The graphics author 1 generates an image 3 and stores this image as a GIF file 2. The GIF file 2 is then submitted to a forum submission library 4. When the SYSOP 5 of that forum library processes the GIF file, a tagging application 6 is run. The tagging application 6 checks the file for a previous TRI 12, and if it exists, verifies the checksum. If the file 2 and its TRI 12 are still acceptable, the SYSOP 5 has the tagging application 6 add to a TRI 13 that contains TRTs for the submitter and for the forum, library, submission date, and file name. If a previous TRI 12 was not present, a new TRI 13 is created. The tagging application 6 may also encrypt the TRI 13 to make it unintelligible to unauthorized viewers. The resulting file 7 with new TRTs and an updated TRI 13 is next released back into the forum library 4 and is made available for downloads by consumers 8 such as subscribers to the system.

When a consumer 8 downloads the tagged file 7, the file transfer service 9 detects that the file is a GIF file with a TRI 13 and appends to the TRI 13 TRTs that contain the consumer's identity and download date. The file that the consumer receives 10 thus has a TRI 14 that contains previous tagging information and information relative to the current file transfer. This information may include any earlier TRI, the name or code for the current submitter, the forum, the submission date, the file name on the forum, the download consumer identification code, and the download date. Other information may also be included. The file transfer service may also encrypt the TRI 14. If the TRI 14 is encrypted, a different key may be used each time the file is downloaded to a different subscriber. When the consumer 8 displays the image 3 with a GIF viewer 11, the TRI 14 does not affect the operation of the GIF viewer 11 because the TRI 14 is in a field in the GIF file 10 that is not processed by GIF viewers 11. Thus, the consumer 8 is not aware of the TRI while viewing the image 3. The tagging process is thus completely transparent to the consumer 8.

If the consumer has a specialized viewer that displays special fields, the TRI 14 is not intelligible because it was encrypted by both the tagging application 6 and the file transfer service 9. Because the SYSOP retains the keys necessary to decrypt the TRI 14, the consumer has no means for reading it. Special viewers 15 that can decrypt and display the TRI 14 are provided to system personnel but these viewers cannot be used to modify the TRI due to the encryption requirements to do so. That is, they are "read only" viewers that are not equipped with the "write" portion of the decryption key.

Figure 2:
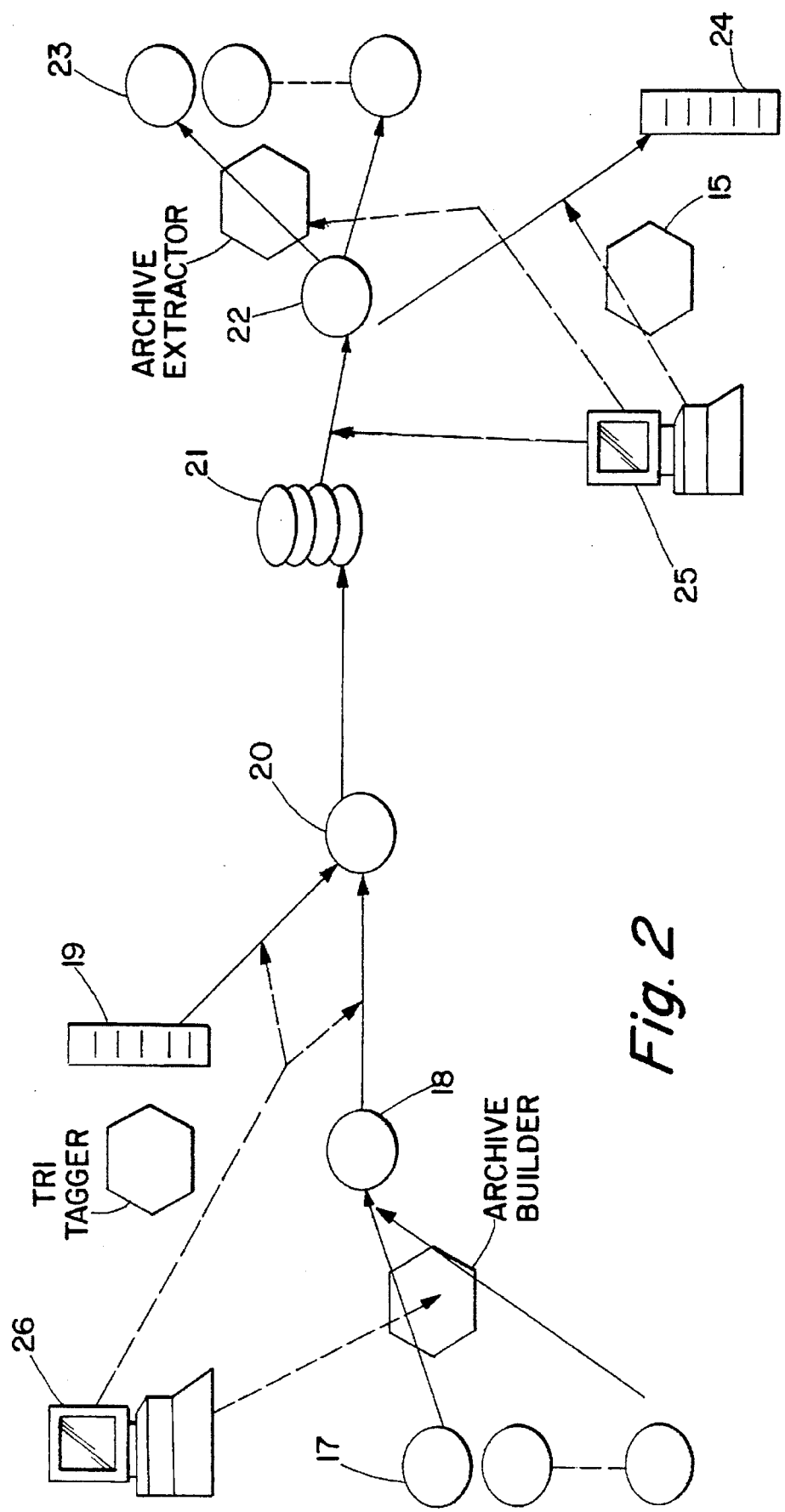
FIG. 2 shows the route that a collection of program components might take from the time it is authored, through its submission to a library and its retrieval from that library, to its use by a client.

A similar process is used for archive files. FIG. 2 is a flow diagram of a route of an archive file as it is passed from an originator to a program user. An archive file 18 is typically an assembly of multiple program components and data files 17 combined into a single entity for distribution as a unit. Many archive systems also compress each component included in the unit. Most archive systems provide a means of adding descriptions and/or comments to the unit, or to each component, in designated fields. One such field is used to store the TRI for the unit.

The author 26 (or distributor) of a product transfers the product into an archive file 18 for subsequent distribution. The author 26 runs an application that adds an annotation field 19 that includes pertinent tracking information in an encrypted format. This tracking information includes any earlier TRI, the name or code for the current submitter, the forum, the submission date, and the file name on the forum.

The result is a Signed Archive File 20, which may be provided to a subscriber bulletin board 21. Thus, when a program user 25 downloads the. file 20 from the bulletin board 21, all this information is incorporated in the file 22. When they extract the components 23 from the archive 22, the annotation is a separate part and is not extracted. Special viewers that can decrypt and display the TRI 24 are provided to system personnel but these viewers cannot modify the TRI 24 due to special encryption requirements to do so.

Once a legitimate subscriber has downloaded a file, any subsequent copying of that downloaded file will carry the TRI with it. Thus, if the last legitimate copier of the file makes another copy and disseminates it to a third party, the file in the possession of the third party will contain a TRT naming the last legitimate user. If the third party is caught with the file, that last valid user can be charged a royalty for dissemination of the file.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons skilled in the art.

What is claimed is:

1. A method for tracking an information file through file transfers, comprising:
   a) inserting a tracking tag into an unused portion of the information file, the tracking tag including data regarding the current possessor of the information file;
   b) adding data regarding a recipient and an information file transfer to the tracking tag; and
   c) transferring the information file to the recipient.

2. The method of claim 1, further comprising encrypting the tracking tag before inserting the tracking tag into the unused portion of the information file.

3. The method of claim 1, further comprising encrypting the tracking tag before transferring the information file to the recipient.

4. The method of claim 1, wherein the data regarding the recipient includes data identifying the recipient.

5. The method of claim 4, further comprising reading the data identifying the recipient to determine if a person possessing the information file is the recipient.

6. The method of claim 3 wherein the data regarding the recipient includes data identifying the recipient.

7. The method of claim 6, further comprising reading the data identifying the recipient to determine if a person possessing the information file is the recipient.

8. A system for tracking an information file, comprising:
   a) logic adapted to insert a tracking tag into an unused portion of the information file, the tracking tag including data regarding a current possessor of the information file;
   b) logic disposed to add data regarding a recipient and an information file transfer to the tracking tag; and
   c) an output port disposed to transfer the information file to the recipient.

9. The system of claim 8, further comprising logic adapted to encrypt the tracking tag before inserting the tracking tag into the unused portion of the information file.

10. The system of claim 8, further comprising logic adapted to encrypt the tracking tag before transferring the information file to the recipient.

11. The system of claim 8, wherein the data regarding the recipient includes data identifying the recipient.

12. The system of claim 11, further comprising a device adapted to read the data identifying the recipient to determine if a person possessing the information file is the recipient.

13. The system of claim 10 wherein the data regarding the recipient includes data identifying the recipient.

14. The system of claim 13, further comprising a device adapted to read the data identifying the recipient to determine if a person possessing the information file is the recipient.

15. A system for transferring an information file from an originator to a recipient, comprising:
   a) an input device for accepting the information file from the originator;
   b) logic disposed to insert a tracking tag into an unused portion of the information file, the tracking tag including data regarding a current possessor of the information file;
   c) logic adapted to add data regarding a recipient and an information file transfer to the tracking tag; and
   d) an output port disposed to transfer the information file to the recipient.

16. The system of claim 15, further comprising logic adapted to encrypt the tracking tag before inserting the tracking tag into the unused portion of the information file.

17. The system of claim 15, further comprising logic adapted to encrypt the tracking tag before transferring the information file to the recipient.

18. The system of claim 15, wherein the data regarding the recipient includes data identifying the recipient.

19. The system of claim 18, further comprising a device adapted to read the data identifying the recipient to determine if a person possessing the information file is the recipient.

20. The system of claim 17 wherein the data regarding the recipient includes data identifying the recipient.

21. The system of claim 20, further comprising a device adapted to read the data identifying the recipient to determine if a person possessing the information file is the recipient.

* * * * *

UNITED STATES PATENT AND TRADEMARK OFFICE
CERTIFICATE OF CORRECTION

PATENT NO. : 5,649,013
DATED : July 15, 1997
INVENTOR(S) : Kent D. Stuckey, Douglas P. Chinnock and Jon L. Roberts It is certified that error appears in the above-indentified patent and that said Letters Patent is hereby corrected as shown below:

In column 5, line 1, please delete the word "the." and replace it with "the".

Signed and Sealed this

Twenty-eighth Day of October, 1997

Attest:

BRUCE LEHMAN

Attesting Officer

Commissioner of Patents and Trademarks